(12) United States Patent
Daly

(10) Patent No.: US 10,465,729 B2
(45) Date of Patent: Nov. 5, 2019

(54) TOGGLE FIXING AND METHOD OF MOUNTING A TOGGLE FIXING

(71) Applicant: Fischerwerke GmbH & Co. KG, Waldachtal (DE)

(72) Inventor: Aaron Daly, Pfalzgrafenweiler (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 153 days.

(21) Appl. No.: 15/520,630

(22) PCT Filed: Oct. 6, 2015

(86) PCT No.: PCT/EP2015/001955
§ 371 (c)(1),
(2) Date: Apr. 20, 2017

(87) PCT Pub. No.: WO2016/062372
PCT Pub. Date: Apr. 28, 2016

(65) Prior Publication Data
US 2017/0314600 A1    Nov. 2, 2017

(30) Foreign Application Priority Data

Oct. 24, 2014   (DE) .......................... 10 2014 015 679

(51) Int. Cl.
*F16B 13/00*    (2006.01)
*F16B 13/08*    (2006.01)

(52) U.S. Cl.
CPC ............................... *F16B 13/0808* (2013.01)

(58) Field of Classification Search
CPC .................................................. F16B 13/0808
(Continued)

(56) References Cited

U.S. PATENT DOCUMENTS 991,426 A * 5/1911 Clements ............ F16B 13/0808
411/340
3,211,042 A 10/1965 Fischer
(Continued)

FOREIGN PATENT DOCUMENTS

CH          550 949 A     6/1974
DE         1 121 792 B    1/1962
(Continued)

OTHER PUBLICATIONS

Preliminary Report on Patentability dated Apr. 25, 2017 for corresponding International Application No. PCT/EP2015/001955 and English translation.
(Continued)

*Primary Examiner* — Flemming Saether
(74) *Attorney, Agent, or Firm* — Renner, Otto, Boisselle & Sklar, LLP

(57) ABSTRACT

The invention relates to a toggle fixing for fixing an article to a thin-walled building component. The toggle fixing comprises a crosspiece and a strip. The crosspiece is elongated, with an opening for receiving a screw. The strip for holding and positioning the crosspiece is joined to the crosspiece and extends along a strip longitudinal axis ($L_3$). According to the invention, there is arranged on the strip an elongated grip element which projects from the strip at an angle with respect to the strip longitudinal axis ($L_3$).

16 Claims, 4 Drawing Sheets

(58) Field of Classification Search
USPC .......................................... 411/340, 344, 345
See application file for complete search history.

(56) References Cited

U.S. PATENT DOCUMENTS

| | | | |
|---|---|---|---|
| 3,288,014 A | 11/1966 | Mortensen | |
| 4,075,924 A * | 2/1978 | McSherry | F16B 13/0808 411/112 |
| 4,650,386 A * | 3/1987 | McSherry | F16B 13/0808 411/340 |
| 6,318,941 B1 * | 11/2001 | Guenther | F16B 13/0808 411/342 |
| 6,821,069 B2 * | 11/2004 | Ikuta | F16B 13/0808 411/340 |
| 2011/0225793 A1 | 9/2011 | Daniels, III | |
| 2011/0268528 A1 | 11/2011 | Gaudron et al. | |

FOREIGN PATENT DOCUMENTS

| | | |
|---|---|---|
| FR | 1 175 798 A | 4/1959 |
| FR | 2 715 684 A1 | 8/1995 |
| GB | 182 293 A | 7/1922 |
| WO | WO 80/00734 A1 | 4/1980 |
| WO | WO 86/04394 A1 | 7/1986 |

OTHER PUBLICATIONS

International Search Report and Written Opinion for corresponding International Application No. PCT/EP2015/001955 dated Dec. 16, 2015.

\* cited by examiner

TOGGLE FIXING AND METHOD OF MOUNTING A TOGGLE FIXING

TECHNICAL FIELD OF INVENTION

The invention relates to a toggle fixing and to a method of mounting a toggle fixing having the features described herein.

DISCUSSION OF RELATED ART

Patent specification DE 1 121 792 discloses a generic toggle fixing. The toggle fixing is used for fixing an article to a thin-walled building component. A "thin-walled" building component is, for example, a plasterboard panel, as used in drywall construction, for example for making walls and for lining ceilings. A "thin-walled" building component can also be, however, the wall of a vertically perforated brick or the wall of an item of ceramic sanitaryware. In the installed state, the rear side of the building component is usually not accessible, but there is a cavity behind the building component. If the building component is, for example, a plasterboard panel and if an article is to be fixed thereto, first of all a hole is drilled through the plasterboard panel and a crosspiece of the toggle fixing is introduced through the drilled hole into the cavity behind the panel. In the case of the toggle fixing known from patent specification DE 1 121 792, the crosspiece is in the form of a parallelepipedal component made of plastics material which is elongated along a crosspiece longitudinal axis and has a through-opening in the centre for receiving a wood screw. Joined integrally to the crosspiece is a strip with which the crosspiece can be held and positioned in the cavity. The crosspiece is drawn against the rear side of the panel by means of the strip, so that the supporting side of the crosspiece rests against the panel and the crosspiece is clamped against the panel by means of a sleeve arranged on the strip. The article can then be fixed to the crosspiece by means of a screw which is screwed into the through-opening.

SUMMARY OF THE INVENTION

The problem of the invention is to provide an alternative toggle fixing, the mounting of which is user-friendly.

That problem is solved according to the invention by a toggle fixing and to a method of mounting a toggle fixing having the features described herein. The toggle fixing according to the invention for fixing an article to a thin-walled building component, for example to a plasterboard panel, has a crosspiece and at least one strip. The crosspiece is elongated along a crosspiece longitudinal axis, that is to say it can be circumscribed by a body, especially by a parallelepiped, which in one dimension—the length in the direction of the crosspiece longitudinal axis—is a multiple larger than in the two other dimensions—the height and the width—which run orthogonally with respect to one another and orthogonally with respect to the crosspiece longitudinal axis. The crosspiece has an opening for receiving a screw, which opening is especially in the form of a through-opening and extends along an opening longitudinal axis which runs transversely, especially substantially orthogonally, with respect to the crosspiece longitudinal axis. If the crosspiece of the toggle fixing, in the installed state, is located in a cavity behind the building component, the opening longitudinal axis is oriented in such a way that a screw can be inserted through the building component into the opening. The screw, for example a wood screw or a screw having a metric thread, can be fixed directly in the opening or in a separate fixing element of the toggle fixing. The strip joined to the crosspiece serves for holding and positioning the crosspiece during mounting. The strip is especially elongated and especially produced from plastics material so as to be resistant to bending. It is especially inherently resistant to bending but movably attached to the crosspiece. In particular, the crosspiece can be tilted with respect to the crosspiece for insertion into a drilled hole. In order to be able to position the crosspiece as precisely as possible, a grip element is arranged on the end of the strip remote from the crosspiece.

To enable the handling of the toggle fixing according to the invention to be as simple and intuitive as possible for the user, the grip element of the toggle fixing according to the invention is elongated. "Elongated" means herein that the cross-section of the grip element is small in relation to its length. The length of the grip element is especially a multiple of its diameter. "A multiple" means herein at least twice, especially three times or four times. "Diameter" means the diameter of a circle circumscribing the cross-section of the grip element. In addition, the grip element projects from the strip at an angle with respect to the strip longitudinal axis. That means that the grip element forms an elongated handgrip which projects laterally from the strip, this particularly facilitating rotation of the toggle fixing about the strip longitudinal axis. In addition, such a grip element can be used to probe for obstructive geometry in a method described here.

"Elongated" does not mean, however, that the grip element must necessarily extend in a straight line. For example, in a preferred embodiment of the toggle fixing according to the invention the grip element is arcuately curved, with the result that it is easy to hold and to move.

In an alternative embodiment of the toggle fixing according to the invention, the grip element is of cantilever-like construction, the grip element especially projecting from the strip in a straight line and at a right angle. In this embodiment the grip element is preferably parallel to the crosspiece longitudinal axis when the strip longitudinal axis runs orthogonally with respect to the crosspiece longitudinal axis. This embodiment of the toggle fixing is not only easy to grip, hold and move with the hand, but in addition can also be used as a gauge for probing for obstructive geometry in a method described herein, when a cavity behind a thin-walled building component into which the grip element is to be inserted as gauge has only a shallow depth.

It is also preferable for there to be arranged on the strip a sleeve for securing the toggle fixing against the building component. The sleeve has a feed-through opening for the strip, the cross-section of which opening is complementary to the cross-section of the grip element in such a way that the sleeve can be pushed over the grip element. The feed-through opening especially has a cross-section which substantially corresponds to the cross-section of the grip element. On the grip element and/or on the strip there can be a provided a retaining element which prevents unintentional detachment of the sleeve from the strip or from the grip element. The retaining element can be configured, for example, as an elastic resilient element which allows the sleeve to be pushed onto the grip element and the strip, but blocks movement of the sleeve in the opposite direction. The sleeve can accordingly be premounted on the strip in a simple way.

Preferably the feed-through opening is configured in such a way that it surrounds, especially entirely encompasses, the strip, with the result that the sleeve can be pushed onto or removed from the strip or grip element only by movement in the strip longitudinal direction or in the longitudinal direction of the grip element. For that purpose, for example, an annular element, especially a collar, can be provided on the sleeve.

In a further preferred embodiment of the toggle fixing according to the invention the free end of the grip element is a distance from the strip that corresponds at least to the distance between the strip and the first end of the crosspiece which is the closest end in the direction of the crosspiece longitudinal axis. It is thus ensured that the grip element is sufficiently long that it can be used as a gauge for probing for possible obstructive geometries in the method described herein. In particular, the distance between the free end of the grip element and the strip is greater than half the length of the crosspiece.

To mount the toggle fixing according to the invention, first of all a hole is drilled in a thin-walled building component. The grip element is then inserted into the drilled hole in such a way that the grip element engages behind the thin-walled building component and is located in a cavity behind the building component. The cavity can be empty or, for example, filled by a compressible insulating material, as is customary for partition walls in drywall construction. The grip element and the strip are each resistant to bending, especially also being joined to one another so as to be resistant to bending, and are of sufficiently strong construction that an insulation material customary in drywall construction, such as, for example, glass wool or rock wool, can be displaced with the grip element. The strip is then moved in such a way that the grip element moves in the cavity and any obstructive geometry located in the cavity can be probed with the grip element. Obstructive geometry can be, for example, a cable, a pipe, a wooden lath, a metal profile or masonry. If obstructive geometry is probed, the user knows that obstructive geometry is present and where it is located. After removal of the strip and the grip element from the drilled hole, the crosspiece of the toggle fixing can be introduced into the cavity in such a way that the crosspiece engages behind the building component. The opening located in the crosspiece can especially be situated in the region of the drilled hole, so that a screw can be inserted through the drilled hole into the opening. Since the position of any obstructive geometry is known as a result of the probing, the crosspiece can be aligned so that the obstructive geometry does not interfere with the crosspiece of the toggle fixing making contact with the thin-walled building component as intended and the toggle fixing can be fixed to the building component. Subsequently a sleeve arranged on the grip element or on the strip can be pushed along the strip towards the building component and the crosspiece can be clamped against the building component by means of the sleeve. By screwing a screw into the opening of the crosspiece, the article is then fixed to the building component, especially by positioning the article against the building component and, by screwing in the screw, clamping the article against the building component by means of the crosspiece.

To probe for obstructive geometry, the strip is preferably moved in rotation about the strip longitudinal axis or an axis parallel to the strip longitudinal axis.

It is especially preferable for the strip to be moved along the wall of the drilled hole and in so doing to be turned through 360 degrees about the strip longitudinal axis. The free end of the grip element accordingly moves substantially on a circular path or on a path similar to a circular path and therefore probes the entire region in which it would be possible for the crosspiece to make contact with the building component.

In the case of a panel-like, flat building component, the movement can take place especially in a plane parallel to the building component and/or within a cylindrical volume.

The invention is explained in greater detail below with reference to two exemplary embodiments shown in the drawing, wherein:

DETAILED DESCRIPTION OF THE INVENTION

Figure 1:
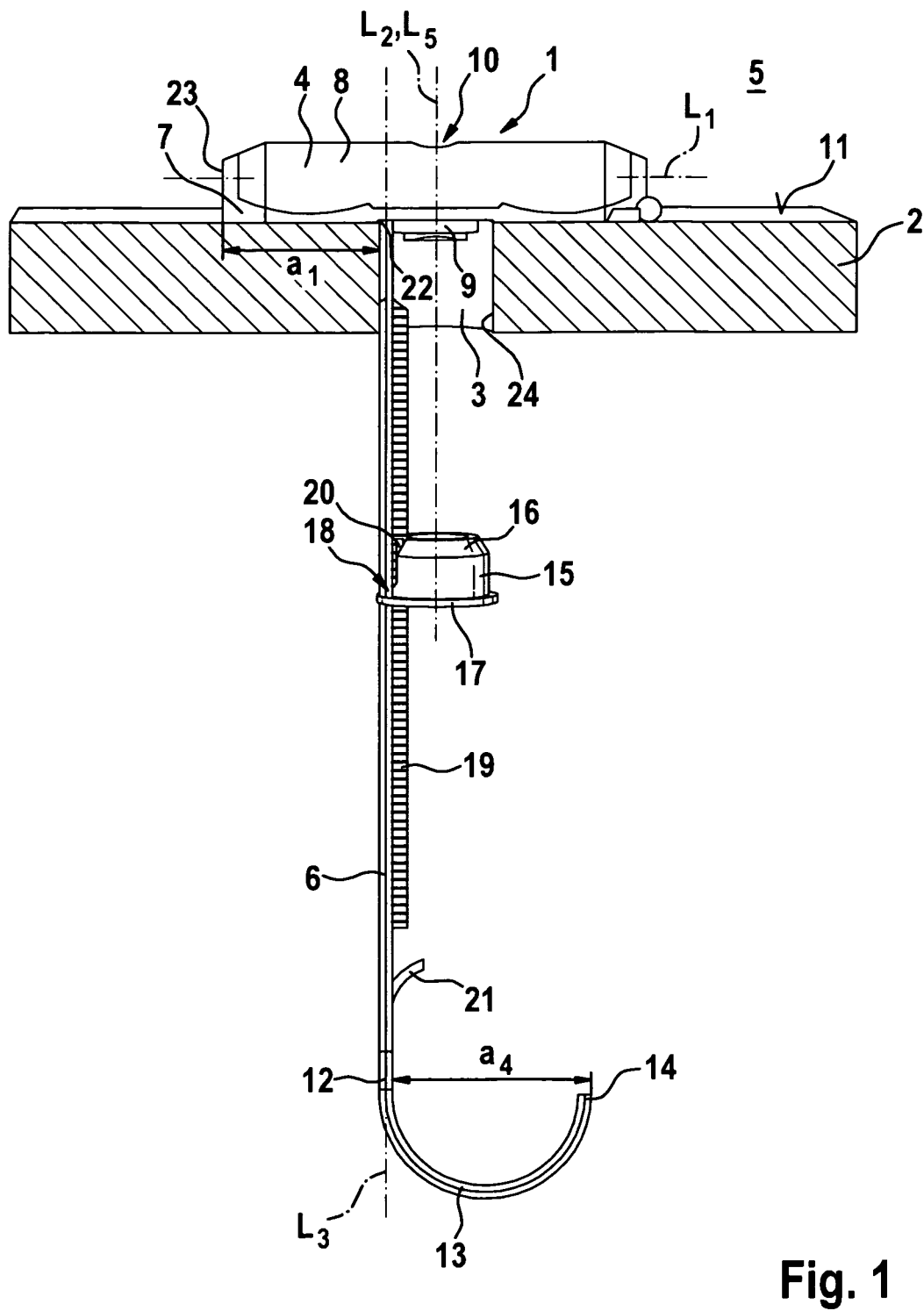
FIG. 1 shows, partly in section, a first toggle fixing according to the invention during mounting on a building component.

FIG. 1 shows a first toggle fixing 1 according to the invention during mounting of the toggle fixing 1 on a thin-walled building component 2, herein a plasterboard panel. A hole 3 has been drilled in the building component 2, through which hole a crosspiece 4 of the toggle fixing 1 has been introduced into a cavity 5 located behind the building component 2, so that the crosspiece 4 engages behind the building component 2. The toggle fixing 1 comprises the crosspiece 4 and a strip 6. The crosspiece 4 is elongated along a crosspiece longitudinal axis $L_1$; its length is therefore a multiple greater than its width or height. The strip 6 is joined integrally, but movably, to a contact body 7 of the crosspiece 4 by way of a connection site 22 and has been produced together with the contact body 7 from a polyamide in an injection-moulding process. The contact body 7 rests on the rear side 11 of the flat, panel-like building component 2 and, together with a supporting body 8, forms the crosspiece 4. The rigid supporting body 8 has been produced from a fibre-reinforced high-strength polyamide and captively connected to the contact body 7 by locking elements (not shown). In the centre of the supporting body 8 there is formed a screw sleeve 9 which passes through the contact body 7 and encompasses an opening 10 formed as a through-opening. The opening 10 extends perpendicularly to the flat rear side 11 of the building component 2 and transversely with respect to the crosspiece longitudinal axis $L_1$ along an opening longitudinal axis $L_2$. The crosspiece 4 is aligned in such a way that the opening longitudinal axis $L_2$ coincides with the longitudinal axis $L_5$ of the drilled hole. The opening 10 serves to receive a screw (not shown) with which an article (not shown) can be fixed to the building component 2.

The strip 6 is likewise elongated. It extends along a strip longitudinal axis $L_3$. The strip 6 serves for holding and positioning the crosspiece 4 so that it can be moved and aligned on the rear side 11 of the building component 2. At the end 12 of the strip 6 remote from the crosspiece 4 there is arranged a grip element 13 by which the toggle fixing 1 can be held, moved and positioned. The grip element 13 is likewise elongated, that is to say has a cross-section which can be circumscribed by a circle the diameter of which is a multiple smaller than the grip element 13 is long. The grip element 13 is arcuately curved with respect to the strip longitudinal axis $L_3$, in the form of a semi-circular arc, and has a free end 14 the distance $a_4$ of which from the strip—the distance between the strip 6 and the side of the free end 14 remote from the strip 6 corresponds at least to the distance $a_1$ between the strip 6 and the first end 23 of the crosspiece 4 which is the closest end in the direction of the crosspiece longitudinal axis $L_1$.

The grip element 13 so configured can easily be held and manipulated by a user. A further advantage is that, to secure the toggle fixing 1 against the building component 2, a sleeve 15 arranged on the strip 6 can be mounted on the grip element 13 and the strip 6 and joined to the toggle fixing 1 simply by being pushed on. The sleeve 15 comprises an insertion slope 16 and a collar 17 and has a feed-through opening 18 for the grip element 13 and the strip 6, the cross-section of which opening is complementary to the cross-section of the grip element 13 and the cross-section of the strip 6. That means that the feed-through opening 18 is formed in such a way that the sleeve 6 can be pushed over the grip element 13 onto the strip 6. The feed-through opening 18 of the sleeve 15 is configured in such a way that it surrounds the grip element 13 and the strip 6 and entirely encompasses them with the annular collar 17. On the strip 6 there is arranged a toothed rack 19 which meshes with locking elements 20 of the sleeve 15 which are arranged in the feed-through opening 18 and prevent unintentional displacement of the sleeve 15 on the strip 6. In the region of the end 12 of the strip 6 remote from the crosspiece 4 there is additionally arranged a resilient tongue 21 which, as retaining element, allows the sleeve 15 to be pushed onto the strip 6, but prevents unintended removal of the sleeve 15 from the strip 6.

Figure 2:
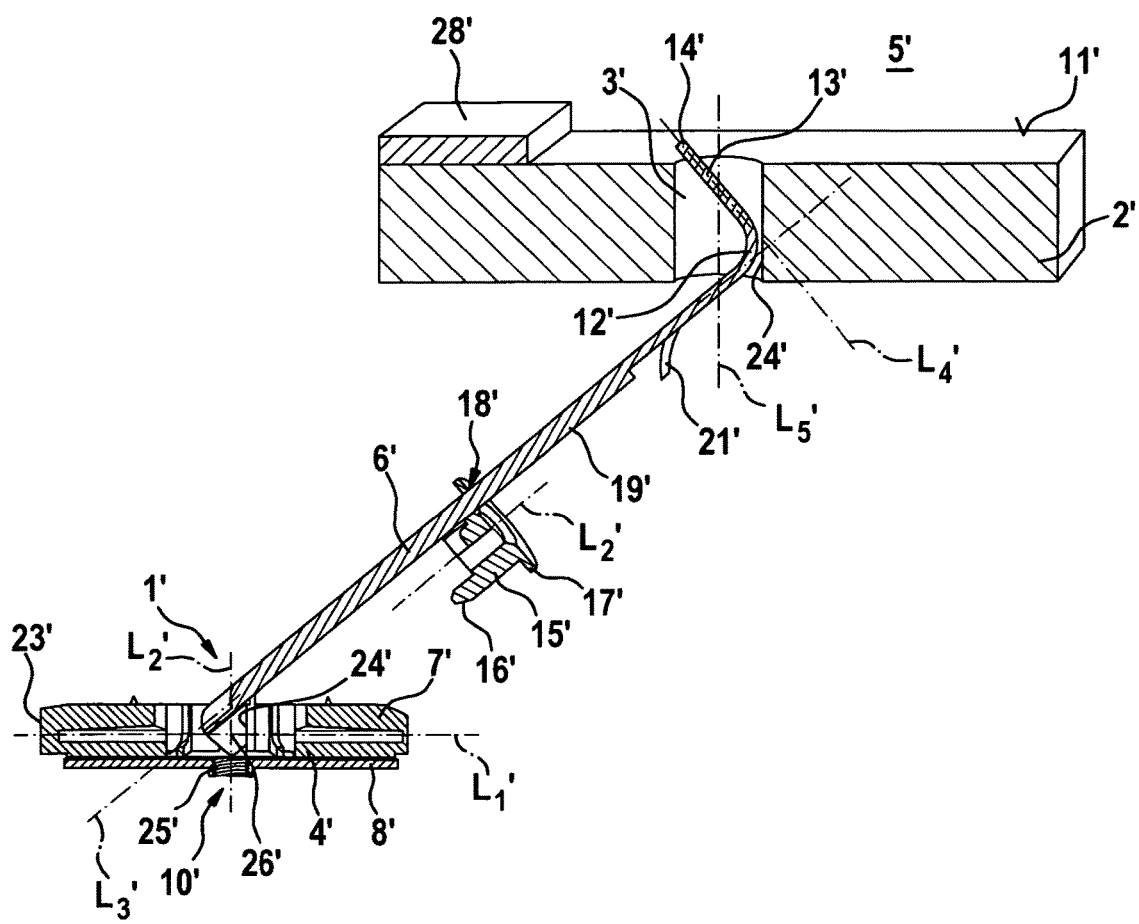
FIG. 2 shows, partly in section, a second toggle fixing according to the invention in which the grip element has been inserted into a drilled hole in a building component.
Figure 3:
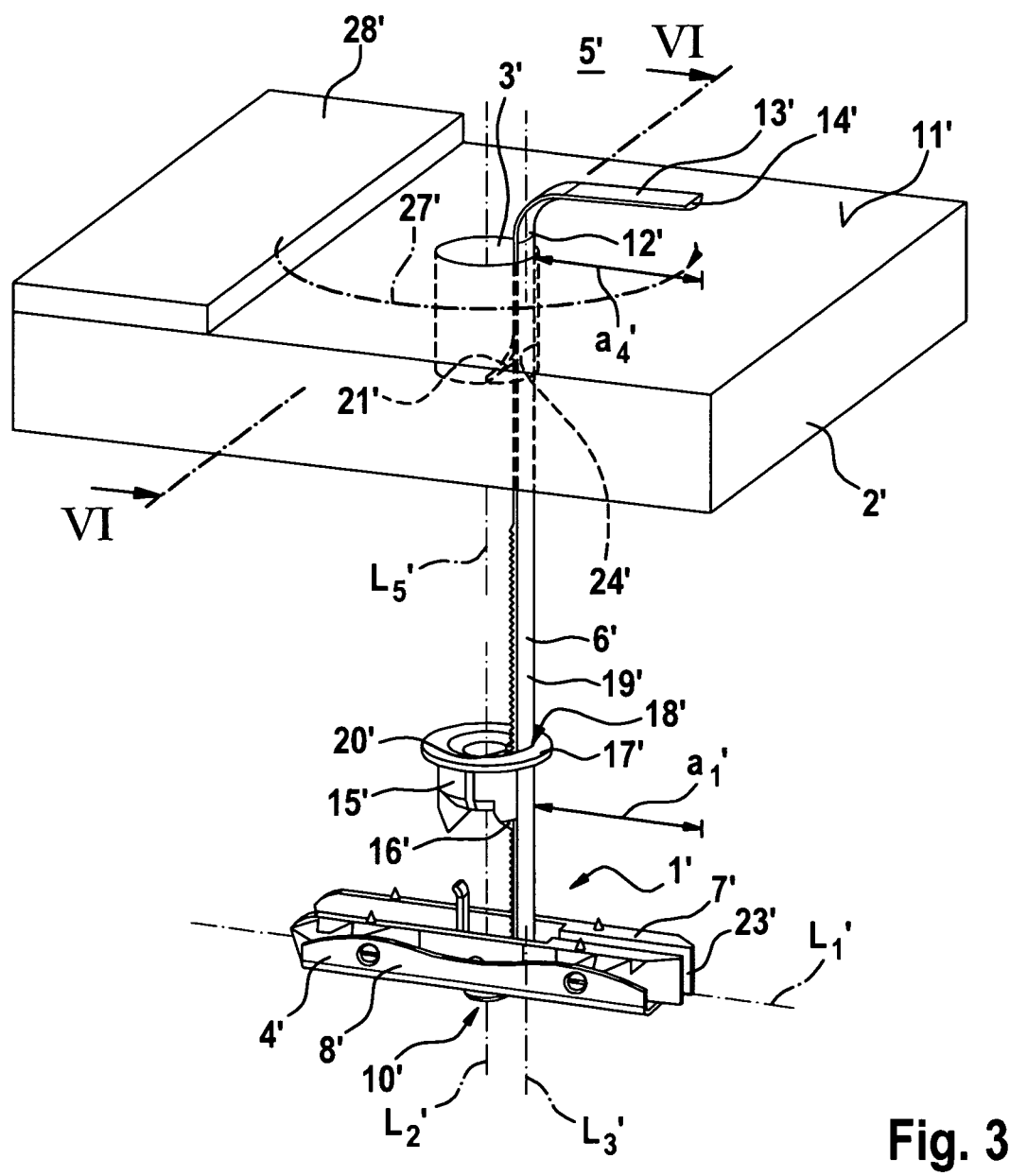
FIG. 3 shows a perspective view of the second toggle fixing according to the invention after insertion of the grip element into a cavity located behind the building component.
Figure 4:
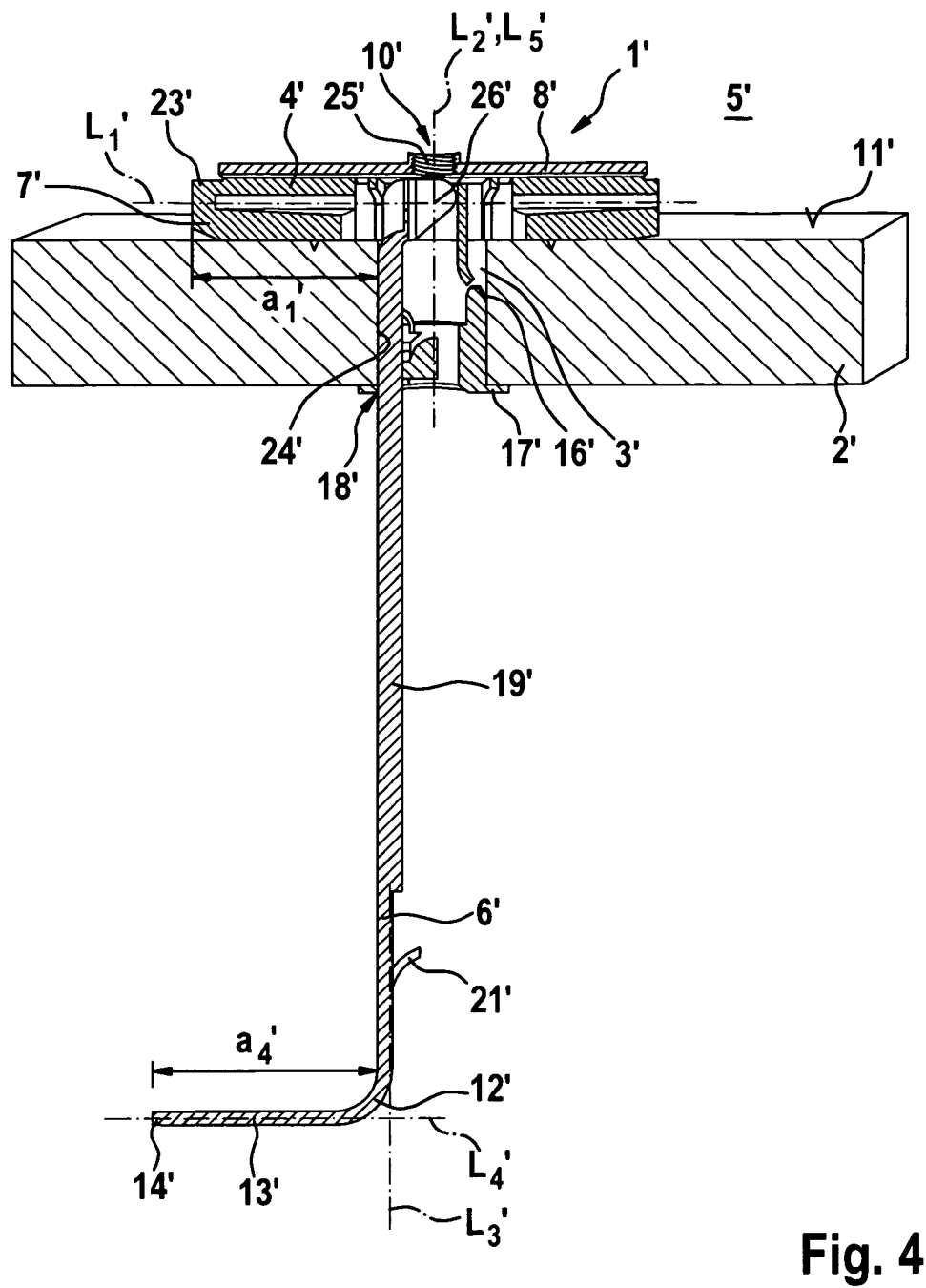
FIG. 4 shows the second toggle fixing according to the invention in an installed state in a sectional view along axis IV-IV from FIG. 3.

In the case of this first toggle fixing 1 according to the invention it is likewise possible to use the grip element 13 as a gauge for probing for any obstructive geometry located in the cavity 5, as shown in respect of a second toggle fixing 1' according to the invention in FIGS. 2 to 4 and described below: the second toggle fixing 1' according to the invention for fixing an article (not shown) to a thin-walled building component 2' likewise has a crosspiece 4' which extends and is elongated along a crosspiece longitudinal axis $L_1'$, and a strip 6'. The crosspiece 4' consists of a U-shaped supporting body 8' made of steel in which a contact body 7' made of plastics material is arranged. In the crosspiece 4' there is formed an opening 10' which serves for receiving a screw (not shown) and extends transversely, more precisely substantially orthogonally, with respect to the crosspiece longitudinal axis $L_1'$ along an opening longitudinal axis $L_2'$. In order to be able to join a screw tension-resistantly to the crosspiece 4', the opening 10' in the supporting body 8' is formed as a thread 25' for a metric screw. The strip 6' is joined to the crosspiece 4' by way of a pivot bearing 26' acting as connection site 22' in such a way that the crosspiece 4' can be tilted relative to the strip 6'. The strip 6' extends along a strip longitudinal axis $L_3'$ and likewise serves for holding and positioning the crosspiece 4' during mounting of the toggle fixing 1' on the article 2'. As in the case of the first toggle fixing 1 according to the invention shown in FIG. 1, on the strip 6' there are arranged a sleeve 15', a toothed rack 19' and a resilient tongue 21' which correspond in their form and function to the corresponding components of the first toggle fixing 1. At the end 12' of the strip 6' remote from the crosspiece 4' there is likewise additionally arranged a grip element 13' which is elongated and of cantilever-like construction and inclined with respect to the strip longitudinal axis $L_3'$, the grip element in this case projecting from the strip 6' substantially in a straight line and at a right angle. In FIGS. 3 and 4 it can be seen that the grip element 13' is constructed in such a way that it is parallel to the crosspiece longitudinal axis $L_1'$ when the strip longitudinal axis $L_2'$ runs orthogonally with respect to the crosspiece longitudinal axis $L_1'$. As in the case of the first toggle fixing 1 according to the invention of FIG. 1, the grip element 13' is sufficiently long that the distance $a_4'$ between the free end 14' of the grip element 13' remote from the strip 6' and the strip 6' corresponds at least to the distance $a_1'$ between the strip 6' and the end 23' which is the closest end in the direction of the crosspiece longitudinal axis $L_1'$.

To mount the toggle fixing 1' according to the invention, first of all a hole 3' is drilled in the thin-walled building component 2', herein a plasterboard panel. The grip element 13' is then inserted into the drilled hole 3', as can be seen in FIG. 2, until the grip element 13' engages behind the thin-walled building component 2' and is located in a cavity 5' behind the building component 2'. The strip 6' can then be moved along the wall 24' of the drilled hole so that the strip 6' rotates about the strip longitudinal axis $L_3'$ and the longitudinal axis $L_5'$ of the drilled hole 3' which runs parallel to the strip longitudinal axis $L_3'$, the grip element 14' moving in the cavity 5'. In so doing, the free end 14' of the grip element 13' is moved on a circular path 27'. Since the distance $a_4'$ between the free end 14' of the grip element 13' and the strip 6' is at least as great as the distance $a_1'$ between the first end 23' of the crosspiece 4' and the strip 6', the grip element 13' is moved in the volume in which the crosspiece 4' comes to rest when it engages behind the building component 2' after removal of the grip element 13' from the cavity 5' and after introduction of the crosspiece 4' into the cavity 5'. If, during its movement, the grip element 13' encounters obstructive geometry 28', in this case a wooden lath, the user knows that he needs to align the crosspiece 4' of the toggle fixing 1' accordingly after insertion into the cavity 5', so that the obstructive geometry 28' does not impede contact of the crosspiece 4' with the building component 2', as shown in FIG. 4. The mounting of the toggle anchor 1' according to the invention can accordingly take place simply and securely.

To fix the toggle fixing 1', after alignment of the crosspiece 4' in the cavity 5' the sleeve 15' is moved along the strip 6' towards the crosspiece 4' and, with the insertion slope 16' at the front, inserted into the drilled hole 3' until the collar 17' rests against the building component 2'. The collar 17' can then be clamped against the crosspiece 4' by means of the toothed rack 19' and the locking elements 20', as can be seen in FIG. 4. Subsequently the portion of the strip 6' protruding beyond the sleeve 15' and the building component 2' can be cut off or broken off, so that it does not impede the positioning of an article on the collar 17' or the building component 2'. The article can then be fixed to the toggle fixing 1' and clamped against the building component 2' with a screw.

LIST OF REFERENCE SYMBOLS

Toggle Fixing and Method of Mounting a Toggle Fixing 1, 1' toggle fixing
2, 2' building component 3, 3' drilled hole
4, 4' crosspiece
5, 5' cavity
6, 6' strip
7, 7' contact body
8, 8' supporting body
9 screw sleeve
10, 10' opening
11, 11' rear side of the building component 2, 2'
12, 12' end of the strip 6, 6' remote from the crosspiece 4, 4'
13, 13' grip element
14, 14' free end of the grip element 13, 13'
15, 15' sleeve
16, 16' insertion slope
17, 17' collar
18, 18' feed-through opening
19, 19' toothed rack
20, 20' locking element
21, 21' resilient tongue
22, 22' connection site
23, 23' first end of the crosspiece
24, 24' wall of the drilled hole
25' thread
26' pivot bearing
27' circular path
28' obstructive geometry
$L_1$, $L_1'$ crosspiece longitudinal axis
$L_2$, $L_2'$ opening longitudinal axis
$L_3$, $L_3'$ strip longitudinal axis
$L_4'$ grip longitudinal axis
$L_5$, $L_5'$ longitudinal axis of the drilled hole 3, 3'
$a_1$, $a_1'$ distance between the free end 14, 14' of the grip element 13, 13' and the strip 6, 6'
$a_4$, $a_4'$ distance between the first end 23, 23' of the crosspiece 4, 4' and the strip 6, 6'

The invention claimed is:

1. A toggle fixing for fixing an article to a thin-walled building component, having a crosspiece which is elongated along a crosspiece longitudinal axis and has an opening for receiving a screw, the opening extending along an opening longitudinal axis which runs transversely with respect to the crosspiece longitudinal axis, and having at least one strip which is joined to the crosspiece at a connection site, extends along a strip longitudinal axis and serves for holding and positioning the crosspiece during mounting, the strip having a grip element integrally joined to the strip at its end remote from the connection site, wherein the grip element and the connection site are not longitudinally movable relative to the strip, wherein the grip element is elongated and projects from the strip at an angle with respect to the strip longitudinal axis, and wherein a distance between a free end of the grip element and the strip corresponds to at least a distance between the strip and a first end of the crosspiece which is a closest end in a direction of the crosspiece longitudinal axis.

2. The toggle fixing according to claim 1, wherein the grip element is arcuately curved.

3. The toggle fixing according to claim 1, wherein the grip element is formed as a cantilever and projects from the strip substantially in a straight line and at a right angle.

4. The toggle fixing according to claim 3, wherein the strip longitudinal axis runs orthogonally with respect to the crosspiece longitudinal axis when the toggle fixing is in an installed state, and wherein the grip element is parallel to the crosspiece longitudinal axis when the strip longitudinal axis runs orthogonally with respect to the crosspiece longitudinal axis.

5. The toggle fixing according to claim 1, wherein on the strip there is arranged a sleeve for securing the toggle fixing against the building component, having a feed-through opening for the strip, the cross-section of which opening is complementary to the cross-section of the grip element in such a way that the sleeve can be pushed over the grip element.

6. The toggle fixing according to claim 5, wherein the feed-through opening is configured in such a way that it surrounds the strip.

7. The toggle fixing according to claim 1, wherein the distance between the free end of the grip element and the strip is at least half a length of the crosspiece.

8. The toggle fixing according to claim 1, wherein the grip element is arranged perpendicular relative to the strip.

9. The toggle fixing according to claim 1, wherein the strip is pivotably connected to the crosspiece.

10. The toggle fixing according to claim 1, wherein the strip is pivotably connected to the crosspiece by a pivot bearing.

11. The toggle fixing according to claim 1, wherein an end of the grip element that is opposite the free end of the grip element is arcuately curved at an end of the strip.

12. The toggle fixing according to claim 1, wherein the free end of the grip element and an end of the grip element that is opposite the free end of the grip element are aligned in a direction perpendicular relative to the strip.

13. A method of mounting a toggle fixing on a thin-walled building component, wherein the toggle fixing comprises a crosspiece and at least one strip, and the crosspiece is elongated along a crosspiece longitudinal axis and has an opening for receiving a screw, the opening extending along an opening longitudinal axis which runs transversely with respect to the crosspiece longitudinal axis, the strip which serves for holding and positioning the crosspiece during mounting, being joined to the crosspiece at a connection site, wherein the strip, at its end remote from the connection site, has an elongated grip element which is integrally joined to the strip, wherein the grip element and the connection site are not longitudinally movable relative to the strip, and wherein the grip element projects from the strip at an angle with respect to the strip longitudinal axis, wherein a distance between a free end of the grip element and the strip corresponds to at least a distance between the strip and a first end of the crosspiece which is a closest end in a direction of the crosspiece longitudinal axis, the method comprising the following steps:
   a) drilling a hole in the thin-walled building component;
   b) inserting the grip element into the drilled hole in such a way that the grip element engages behind the thin-walled building component and is located in a cavity behind the building component;
   c) moving the strip in such a way that the grip element moves in the cavity and any obstructive geometry is probed with the grip element;
   d) removing the strip and the grip element from the drilled hole; and
   e) introducing the crosspiece into the cavity in such a way that the crosspiece engages behind the building component.

14. The method according to claim 13, wherein in step c) the strip is moved in rotation about the strip longitudinal axis or an axis parallel to the strip longitudinal axis.

15. The method according to claim 14, wherein the strip is moved along the wall of the drilled hole.

16. A toggle fixing for fixing an article to a thin-walled building component, having a crosspiece which is elongated along a crosspiece longitudinal axis and has an opening for receiving a screw, the opening extending along an opening longitudinal axis which runs transversely with respect to the crosspiece longitudinal axis, and having at least one strip which is joined to the crosspiece, extends along a strip longitudinal axis and serves for holding and positioning the crosspiece during mounting, a grip element being arranged on the strip at its end remote from the crosspiece, wherein the grip element is elongated and projects from the strip at an angle with respect to the strip longitudinal axis, wherein a distance between a free end of the grip element and the strip corresponds to at least a distance between the strip and a first end of the crosspiece which is a closest end in a direction of the crosspiece longitudinal axis, wherein on the strip there is arranged a sleeve for securing the toggle fixing against the building component, having a feed-through opening for the strip, the cross-section of which opening is complementary to the cross-section of the grip element in such a way that the sleeve can be pushed over the grip element.

* * * * *